United States Patent [19]

Chen

[11] Patent Number: 4,544,954
[45] Date of Patent: Oct. 1, 1985

[54] TELEVISION RECEIVER WITH HIGH VOLTAGE PROTECTION CIRCUIT

[75] Inventor: Keming J. Chen, San Diego, Calif.

[73] Assignee: RCA Corporation, Princeton, N.J.

[21] Appl. No.: 573,229

[22] Filed: Jan. 23, 1984

[51] Int. Cl.⁴ .................. H04N 5/68; H04N 5/44; H03L 7/00

[52] U.S. Cl. .................. 358/243; 358/193.1; 358/158

[58] Field of Search .................. 358/243, 193.1, 158

[56] References Cited

U.S. PATENT DOCUMENTS

| 4,147,964 | 4/1979 | Luz et al. | 358/243 |
|---|---|---|---|
| 4,253,121 | 2/1981 | Avery | 358/243 |
| 4,345,275 | 8/1982 | Waybright | 358/243 |
| 4,390,902 | 6/1983 | Chin et al. | 358/192.1 |
| 4,398,303 | 8/1983 | Chin et al. | 455/168 |

OTHER PUBLICATIONS

Copending, concurrently filed U.S. patent application Ser. No. (573,228) of K. J. Chen titled "Video Sync Validity Detector".

Primary Examiner—John C. Martin
Assistant Examiner—E. Anne Toth
Attorney, Agent, or Firm—P. J. Rasmussen; P. M. Emanuel; R. H. Kurdyla

[57] ABSTRACT

A high voltage generator in a television receiver responds to horizontal deflection rate signals from a horizontal oscillator which normally responds to a horizontal sync signal derived from the television signal. A sync validity detector provides a control signal indicative of the validity of the horizontal sync signal to an electronic tuning system in order to identify active channels, and to the deflection system to inhibit the response of the deflection system to false sync signals otherwise capable of causing the oscillator to operate a lower frequency likely to cause the high voltage generator to develop an excessively high voltage.

6 Claims, 1 Drawing Figure

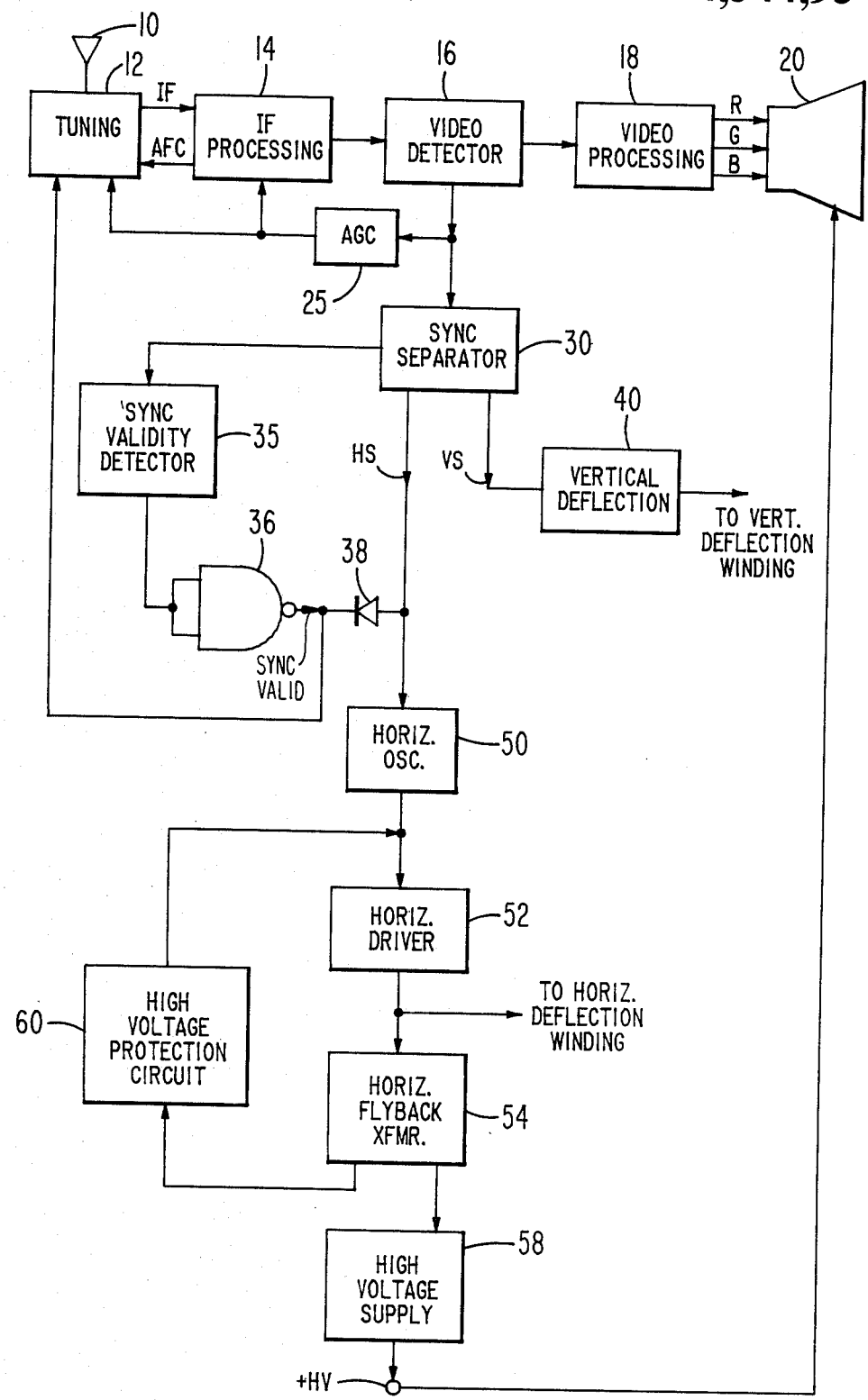

TELEVISION RECEIVER WITH HIGH VOLTAGE PROTECTION CIRCUIT

This invention concerns a television receiver of the type including a high voltage protection circuit for disabling normal receiver operation under abnormal conditions such as when an excessively high operating voltage for the ultor electrode of an image reproducing kinescope is generated.

In a typical television receiver, a DC ultor voltage developed by a high voltage generator is applied to the final anode (ultor) electrode of an image reproducing kinescope to accelerate electron beams onto the phosphor screen of the kinescope. To insure that the receiver is not operated under potentially dangerous fault conditions at excessively high ultor voltage levels, television receivers often include a high voltage protection circuit which disables normal television receiver operation by, for example, disabling the high voltage generator when the ultor voltage approaches unacceptably high values.

The kinescope ultor voltage is typically generated by a high voltage supply comprising a voltage multiplier which responds to horizontal line scanning rate pulses derived from a horizontal flyback transformer included in receiver horizontal deflection control circuits which include a horizontal oscillator. The flyback transformer receives horizontal rate pulses from the horizontal oscillator, which is synchronized by horizontal sync pulses derived from the composite television signal.

Some horizontal deflection control circuits are designed such that if the horizontal oscillator receives improper input synchronizing signals, the horizontal oscillator frequency can decrease below the normal 15,734 Hz frequency of oscillation. Such reduced oscillator frequency can cause the high voltage output from the high voltage generator to increase excessively. This condition is sensed by the high voltage protection circuit, which then disables normal receiver operation.

It is herein recognized that in certain television receiver designs there exists the likelihood that the high voltage protection circuit can be activated in the absence of an actual fault in the high voltage generator. Specifically, in a television receiver constructed on a physically small chassis, the distance between the deflection circuits and the tuning circuits of the receiver is small compared to larger receiver chassis designs. This increases the likelihood that interference signals such as harmonics and radio frequency interference (RFI) generated by the switching operation of the deflection circuits can be picked-up by sensitive "front-end" circuits such as RF amplifiers associated with the tuning system of the receiver. Such interference signals can appear in amplified form at the output of the sync signal separator of the receiver, particularly when the "front-end" circuits exhibit large gain under weak signal conditions as a result of automatic gain control (AGC) action. It has been observed that in a receiver of this type the high voltage protection circuit can be activated without an actual voltage generator fault when a false sync signal is produced due to an intermittent received RF signal condition. For example, this can occur when a receiver is tuned to a channel with an unmodulated picture carrier. It can also occur when the RF signal for a tuned channel is lost for one reason or another. Further, in a receiver with a signal seeking electronic tuning system, it can occur during the signal seeking mode while an active channel is being sought.

Under these condition, unless precautions are taken, the high voltage protection circuit can be activated without an actual voltage generator fault condition being present. Such activation is disturbing to a viewer and can lead a viewer to believe that the high voltage generator exhibits a serious defect, requiring a service call, when in fact such is not the case.

Therefore in accordance with the principles of the present invention there is disclosed herein apparatus for preventing an excessive high voltage condition and activation of the high voltage protection circuit under intermittent signal conditions of the type described above. The disclosed apparatus includes a video sync identifying control circuit which indicates when a normal horizontal sync signal is present and when normal sync is absent. In the latter case a control signal from the control circuit inhibits the response of the horizontal deflection circuit to such signals as may then appear at the output of the sync separator. The horizontal deflection circuit is therefore prevented from responding to false sync signals such as may otherwise lead to the generation of an excessive high voltage level. In a receiver with a signal seeking tuner the control circuit may be part of the system for detecting an active channel.

The single FIGURE of the drawing depicts a portion of a television receiver including apparatus constructed in accordance with the present invention.

A composite broadcast television signal is received by an antenna 10 and applied to an electronic signal seeking tuning network 12 including RF amplifier stages and a channel selector operated by a viewer for initiating a channel changing operation whereby the next active channel is located by signal seeking apparatus. Electronic tuning network 12 can be of the type discussed in U.S. Pat. No. 4,390,902-D. Chin et al., and in U.S. Pat. No. 4,398,303-D. Chin et al. An intermediate frequency (IF) signal developed by tuning network 10 is applied to an IF signal processor 14 which develops an automatic fine tuning (AFT) control signal for controlling tuning network 12 to locate active channels. The IF signal is detected by video detector 16 which provides detected video signals to a luminance and chrominance video processing network 18, which provides R, G, B color signals to an image reproducing kinescope 20. An output of video detector 16 is applied to an automatic gain control (AGC) amplifier which develops an output AGC signal for controlling the signal gain of amplifier circuits in units 12 and 14 in accordance with the magnitude of detected video signals.

The detected video signal is also coupled to a video sync separator 30 which comprises circuits for separating a composite video sync signal from a composite video signal, including circuits responsive to the separated composite sync signal for providing mutually separated horizontal sync (HS) and vertical sync (VS) components of the composite sync signal. Separated vertical sync component VS is applied to vertical deflection windings of the kinescope after processing by vertical deflection control circuits 40. Separated horizontal sync signal HS is used to synchronize the operation of a horizontal oscillator 50 included in horizontal deflection control circuits of the receiver. Output signals at a horizontal line frequency of approximately 15,734 Hz are amplified by a horizontal driver stage 52 before being applied to an input primary winding of a horizontal flyback transformer 54. Amplified horizontal signals are also applied to horizontal deflection windings of the kinescope.

Horizontal flyback signals derived from an output secondary winding of flyback transformer 54 are applied to a high voltage supply 58 (e.g., comprising a voltage multiplier) which generates a high voltage +HV for application to the ultor (anode) electrode of kinescope 20. A high voltage protection circuit 60 has a sensing input coupled to horizontal flyback transformer circuit 54, and a control output coupled to the input of horizontal driver 52. Protection circuit 60 can be of the type described in U.S. Pat. No. 4,345,275-G. Waybright, which patent also shows additional circuit details regarding the implementation of horizontal oscillator 50, driver 52, flyback transformer 54, and high voltage supply 58.

Protection circuit 60 senses a flyback transformer voltage representative of the magnitude of the ultor voltage +HV developed by high voltage supply 58. When an excessive ultor voltage is sensed, a control signal from the output of protection circuit 60 disables the normal oepration of driver 52, thereby disabling high voltage generator 58 and removing the high ultor voltage as described in the aforementioned Waybright patent. In such case normal receiver operation is also disabled.

The horizontal deflection system including oscillator 50, driver 52 and transformer 54 is of the type wherein a decrease in the operating frequency of oscillator 50 results in an increase in the magnitude of ultor voltage +HV. This results because lower frequency horizontal flyback pulses as applied to high voltage supply 58 permit greater energy to be stored during energy storage intervals (i.e., image trace intervals) of the flyback pulse cycle, which leads to the development of increased high voltage output from supply 58. The increased high voltage output produced in response to a lower oscillator frequency can be sufficient to activate high voltage protection circuit 60 for disabling the high voltage generator.

The horizontal deflection system represents a source of interference signals in the form of radio frequency (RF) switching harmonics generated at the 15,734 Hz horizontal line rate, due to the switching action of the horizontal oscillator and other circuits in the horizontal deflection system. It has been observed that such harmonics are particularly likely to be picked up by circuits associated with tuning network 12 in a television receiver design with a relatively small chassis with reduced physical spacing between the deflection circuits and the tuning network. Such intereference signals are likely to appear in amplified form at the output of video detector 16 particularly under weak signal conditions when the signal gains of amplifiers in IF processor 14 and tuning network 12 are high in response to the AGC signal.

The amplified interference signals can also appear at the output of sync separator network 30 as false sync signals and, if permitted to be applied to the sync input of oscillator 50, can produce improper deflection system operation. Specifically, interference signals in the form of false sync signals from sync separator 30 can exhibit a magnitude and phase sufficient to cause oscillator 50 to oscillate at a lower than normal frequency, causing an excessively high ultor voltage +HV to be developed, which in turn activates high voltage protection circuit 60 for disabling the receiver. This result is likely to occur when electronic tuning system 12 operates in a channel searching, signal seeking mode, when the received video signal is lost momentarily between active channels, and when the system is tuned to a channel with an unmodulated picture carrier signal, for example. Activation of the high voltage protection circuit under these circumstances is prevented by means of apparatus including a sync validity detector 35, a logic NAND gate 36 arranged as a signal inverter, and a normally non-conductive diode 38.

As described in detail in my concurrently filed U.S. patent application Ser. No. 553,228 titled "Video Sync Validity Detector", incorporated by reference herein, sync validity detector 35 assists to control the proper tuning operation of electronic tuning system 12. Detector 35 includes average and peak detector circuits coupled to an output of sync separator 30 from which horizontal sync signals are provided. If such sync signals are sensed as being normal, a SYNC VALID signal with a positive logic "1" voltage level is produced at the output of gate 36. This signal is applied to a control input of tuning system 12 and be used to indicate, in conjunction with the AFC signal, that the receiver is tuned to an active channel.

Conversely, the SYNC VALID signal exhibits a less positive "0" logic level approximating ground potential whenever abnormal sync signals, such as including interference signals in the form of radio frequency harmonics at the horizontal line rate from the horizontal deflection system, are provided from sync separator 30. This less positive value for SYNC VALID signal forward biases diode 38 into conduction, thereby coupling the horizontal sync (HS) output of sync separator 30 to a potential approximating ground potential at the output of gate 36 via conductive diode 38.

The conduction of diode 38 inhibits the coupling of false sync signals from the HS output of sync separator 30 to the sync input of horizontal oscillator 50, whereby oscillator 50 exhibits a free-running condition and produces output signals at a frequency of approximately the normal line rate of 15,734 Hz. Networks 52, 54, 58 and 60 operate in a normal mode in response to the free-running condition of oscillator 50 so that high voltage supply 58 is not disabled. Thus conductive diode 38 prevents the horizontal deflection system, and oscillator 50 in particular, from responding to false sync signals which could otherwise cause oscillator to operate at a frequency low enough to cause an excessive ultor voltage +HV to be generated. Accordingly, the high voltage protection circuit remains inactive, and the receiver operates normally, in the presence of false sync signals associated with spurious interference signals.

What is claimed is:

1. In a system for processing a video signal including image and image synchronizing components, said system including an image display device for reproducing an image in response to said video signal; apparatus comprising:

means responsive to said video signal for providing an output signal including an image synchronizing component;

means responsive to said output signal from said providing means for controlling image reproduction by said display device;

detector means coupled to said providing means for producing at an output a first control signal when said output signal from said providing means corresponds to a normal synchronizing component, and a second control signal when said output signal from said providing means corresponds to an abnormal synchronizing component; and means for inhibiting the response of said image reproducing control means to said output signal from said providing means when said second control signal is developed.

2. Apparatus according to claim 1, wherein said image reproducing control means includes a high voltage generator for generating a high operating voltage for said image display device in response to said output signal of said providing means; and a high voltage protection circuit coupled to said high voltage generator for disabling said voltage generator when an excessive high voltage level is developed by said voltage generator.

3. Apparatus according to claim 2, wherein said synchronizing component provided by said providing means corresponds to a horizontal line synchronizing component; and said image reproducing control means corresponds to a horizontal deflection circuit.

4. Apparatus according to claim 3, wherein said second control signal from said detector means inhibits coupling of output signal from said providing means to said deflection means.

5. Apparatus according to claim 1, wherein said system comprises a television receiver including a signal seeking electronic tuning system for locating active channels; and said output of said detector means is also coupled to a control input of said tuning system to identify active channels.

6. In a television receiver for processing a television signal including image and image synchronizing components, said system including an image display device for reproducing an image in response to said television signal; a signal seeking electronic tuning system for locating active channels; and a deflection circuit responsive to at least one synchronizing signal including a synchronizing component for producing at least one deflection signal for controlling image scanning of said display device; apparatus comprising:

means responsive to said television signal for providing to said deflection circuit said synchronizing signal including an image synchronizing component;

high voltage generating means responsive to said deflection signal from said deflection circuit for generating an operating voltage for said image display device; and means coupled to said tuning system and to said deflection circuit and responsive to said synchronizing signal provided by said providing means for conveying a control signal to said tuning system to identify active channels in the presence of a normal synchronizing component from said providing means, and for conveying said control signal to said deflection circuit for inhibiting the response of said deflection circuit to said synchronizing component from said providing means in the absence of a normal synchronizing component from said providing means.

* * * * *